United States Patent
Lai et al.

(10) Patent No.: US 10,976,577 B1
(45) Date of Patent: Apr. 13, 2021

(54) SENSING SUBSTRATE, MANUFACTURING METHOD THEREOF, AND SENSOR

(71) Applicant: National Central University, Taoyuan (TW)

(72) Inventors: Kun-Yu Lai, Taoyuan (TW); Fan-Ching Chien, Taoyuan (TW)

(73) Assignee: National Central University, Taoyuan (TW)

( * ) Notice: Subject to any disclaimer, the term of this patent is extended or adjusted under 35 U.S.C. 154(b) by 0 days.

(21) Appl. No.: 16/691,560

(22) Filed: Nov. 21, 2019

(30) Foreign Application Priority Data

Nov. 6, 2019 (TW) .................................. 108140316

(51) Int. Cl.
*G02F 1/017* (2006.01)
*G01J 3/44* (2006.01)
*G01J 3/02* (2006.01)
*G01N 21/65* (2006.01)

(52) U.S. Cl.
CPC ........ *G02F 1/01716* (2013.01); *G01J 3/0202* (2013.01); *G01J 3/0216* (2013.01); *G01J 3/44* (2013.01); *G01N 21/658* (2013.01); *G02F 2202/108* (2013.01); *G02F 2203/15* (2013.01)

(58) Field of Classification Search
None
See application file for complete search history.

(56) References Cited

U.S. PATENT DOCUMENTS

| | | | |
|---|---|---|---|
| 8,687,186 | B2 | 4/2014 | Wang et al. |
| 2005/0285128 | A1* | 12/2005 | Scherer ................... H01L 33/38 257/98 |
| 2006/0056463 | A1* | 3/2006 | Wang ........................ G01J 3/10 372/3 |
| 2006/0250613 | A1 | 11/2006 | Demuth et al. |
| 2007/0070341 | A1 | 3/2007 | Wang |
| 2010/0190661 | A1 | 7/2010 | Lee et al. |

(Continued)

FOREIGN PATENT DOCUMENTS

| CN | 102156114 A | 8/2011 |
|---|---|---|
| TW | I325956 B | 6/2010 |

(Continued)

OTHER PUBLICATIONS

Lombardi, J. R., "The theory of surface-enhanced Raman scattering on semiconductor nanoparticles; toward the optimization of SERS sensors", Faraday Discussions, vol. 205, pp. 105-120, (2017).

(Continued)

*Primary Examiner* — Shawn Decenzo
(74) *Attorney, Agent, or Firm* — CKC & Partners Co., LLC

(57) ABSTRACT

A sensing substrate including a substrate, a quantum well structure, a sensing surface and metal nanoparticles is provided. The quantum well structure is disposed on the substrate, and the quantum well structure includes at least one first metal nitride layer and second metal nitride layers. The first metal nitride layers and the second metal nitride layers are stacked on the substrate in alternation manner. The quantum well structure is located between the sensing surface and the substrate. The metal nanoparticles are disposed on the sensing surface, and the sensing surface is a rough surface. A manufacturing method of the sensing substrate and a sensor are also provided.

19 Claims, 3 Drawing Sheets

(56) References Cited

U.S. PATENT DOCUMENTS

| | | | | |
|---|---|---|---|---|
| 2011/0140209 A1* | 6/2011 | Wang | ................... | G01N 21/658 257/414 |
| 2011/0267609 A1* | 11/2011 | Wu | ...................... | G01N 21/658 356/301 |
| 2012/0057163 A1* | 3/2012 | Cheng | ................... | B82Y 20/00 356/445 |
| 2012/0113419 A1* | 5/2012 | Wang | ................... | B82Y 15/00 356/301 |
| 2012/0300202 A1* | 11/2012 | Fattal | ................... | G01N 21/658 356/301 |
| 2014/0036262 A1 | 2/2014 | Wang et al. | | |
| 2014/0211196 A1* | 7/2014 | Samuels | ............. | G01N 21/658 356/36 |

FOREIGN PATENT DOCUMENTS

| | | |
|---|---|---|
| TW | I611461 B | 1/2018 |
| TW | 201912574 A | 4/2019 |

OTHER PUBLICATIONS

Mao, P. et al., "Broadband single molecule SERS detection designed by warped optical spaces", Nature Communications, 9, (2018).

Kleinman, S. L. et al., "Creating, characterizing, and controlling chemistry with SERS hot spots", Phys. Chem. Chem. Phys., vol. 15, No. 1, pp. 21-36, (2013).

Pieczonka, N. P. W. et al., "Single molecule analysis by surfaced-enhanced Raman scattering", Chemical Society Reviews, 37(5), pp. 946-954, (2008).

Emory, S. R. et al., "Re-examining the origins of spectral blinking in single-molecule and single-nanoparticle SERS", Faraday Discussions, vol. 132, pp. 249-259, (2006).

Zrimsek, A. B. et al., "Single Molecule Surface-Enhanced Raman Spectroscopy: A Critical Analysis of the Bianalyte versus Isotopologue Proof", The Journal of Physical Chemistry C, 120(9), pp. 5133-5142, (2016).

Chang, Yun-Chorng et al., "Surface Plasmon-Enhanced Spontaneous Emission from InGaN/GaN Multiple Quantum Wells by Indium Nanoparticles Fabricated Using Nanosphere Lithography," Plasmonics (2013) 8: 1395-1400.

* cited by examiner

SENSING SUBSTRATE, MANUFACTURING METHOD THEREOF, AND SENSOR

CROSS-REFERENCE TO RELATED APPLICATION

This application claims priority to Taiwan Application Serial Number 108140316, filed Nov. 6, 2019, which is herein incorporated by reference in its entirety.

BACKGROUND

Field of Disclosure

The present disclosure relates to a sensing substrate, a manufacturing method thereof, and a sensor. More particularly, the present disclosure relates to a sensing substrate, a manufacturing method thereof, and a sensor for spectroscopy.

Description of Related Art

Spectroscopy can identify object and its chemical composition by investigating the spectrum of the object. In the application of spectroscopy, surface-enhanced Raman scattering (SERS) is one of the most promising tool for biomolecule studies. SERS includes an optical resonance between metal and biomolecules, and the resonance results in million-fold enhancement of Raman signals, enabling the observation of biomolecules at low concentrations.

However, reliability of SERS still needs improvement. In a sensing area, resonance of the incident light can only happen at distributed hot spot in the illuminating area, so as to generate Raman scattering. Meanwhile, heat generated by the incident light and the resonance may cause thermal diffusion of the molecule, which leads to severe fluctuation of the SERS signals and thus reduces the sensing reliability. Therefore, the issue is a main obstacle to be overcome by the people having ordinary skill in the art.

SUMMARY

The present disclosure relates in general to a sensing substrate, a manufacturing method of the sensing substrate, and a sensor.

According to an embodiment of the present disclosure, a sensing substrate includes a substrate, a quantum well structure, a sensing surface, and a plurality of metal nanoparticles. The quantum well structure is disposed on the substrate, and the quantum well structure includes at least one first metal nitride layer, and a plurality of second metal nitride layers. The first metal nitride layer and the second metal nitride layers are disposed on the substrate in staggered manner. The sensing surface is adapted to carry a test sample. The metal nanoparticles are disposed on the sensing surface. The quantum well structure is disposed between the substrate and the sensing surface, and the sensing surface is a rough surface.

In an embodiment of the present disclosure, the test sample is disposed near the metal nanoparticles.

In an embodiment of the present disclosure, a material of the substrate includes sapphire, silicon, or silicon carbide.

In an embodiment of the present disclosure, the sensing substrate further includes a first type semiconductor layer. The first type semiconductor layer is disposed on the substrate, and being located between the quantum well structure and the substrate.

In an embodiment of the present disclosure, a material of the first type semiconductor layer includes gallium nitride or aluminum gallium nitride.

In an embodiment of the present disclosure, the sensing substrate further includes a strain-releasing layer. The strain-releasing layer is disposed on the substrate, and being located between the first type semiconductor layer and the substrate.

In an embodiment of the present disclosure, the strain-releasing layer includes a single layer of gallium nitride, aluminum nitride, or aluminum gallium nitride on the substrate.

In an embodiment of the present disclosure, the strain-releasing layer includes a plurality of strain-releasing rods distributed on the substrate.

In an embodiment of the present disclosure, each of the strain-releasing rods includes a zinc oxide core and a gallium nitride shell surrounding the zinc oxide core.

In an embodiment of the present disclosure, number of the first metal nitride layer in the quantum well structure is from 1 to 15.

In an embodiment of the present disclosure, the sensing substrate further includes an undoped semiconductor layer. The undoped semiconductor layer is disposed on the quantum well structure, and the sensing surface is located on the undoped semiconductor layer.

In an embodiment of the present disclosure, a material of the metal nanoparticles includes gold, aluminum, silver, or copper.

In an embodiment of the present disclosure, the sensing surface has a plurality of pyramidal nanostructures, and pitches between the pyramidal nanostructures are from 100 nm to 500 nm.

According to an embodiment of the present disclosure, a manufacturing method of a sensing substrate includes: providing a substrate; forming a quantum well structure on the substrate; forming a sensing surface; and disposing a plurality of metal nanoparticles on the sensing surface. The quantum well structure includes at least a first metal nitride layer and a plurality of second metal nitride layers, and the first metal nitride layer and the second metal nitride layers are disposed on the substrate in a staggered manner. The sensing surface is a rough surface.

In an embodiment of the present disclosure, before the step of forming the quantum well structure on the substrate, the method further includes: forming a strain-releasing layer on the substrate; and forming a first type semiconductor layer on the strain-releasing layer.

In an embodiment of the present disclosure, the step of forming the strain-releasing layer on the substrate further includes: forming a single layer of gallium nitride, aluminum nitride, or aluminum gallium nitride on the substrate.

In an embodiment of the present disclosure, the step of forming the strain-releasing layer on the substrate further includes: forming a plurality of zinc oxide cores on the substrate with a hydrothermal method; and forming a gallium nitride shell around each of the zinc oxide core. The zinc oxide cores and the gallium nitride shells form a plurality of strain-releasing rods respectively, and the strain-releasing rods form the strain-releasing layer.

In an embodiment of the present disclosure, the step of forming the sensing surface further includes: forming an undoped semiconductor layer on the quantum well structure. The sensing surface is on the undoped semiconductor layer.

In an embodiment of the present disclosure, the step of forming the undoped semiconductor layer further includes: providing a chamber having a nitrogen ($N_2$) ambiance. A pressure of the nitrogen ambiance is from 150 mbar to 250 mbar, and a temperature of the nitrogen ambiance is from 580° C. to 1200° C.

According to an embodiment of the present disclosure, a sensor includes a sensing light source, an optical combiner, the sensing substrate, and a spectrometer. The sensing light source provides a first detecting light. The first detecting light reaches the sensing substrate through the optical combiner. The sensing surface carries the testing sample, and the testing sample generate a second detecting light after excited by the first detecting light, and the second detecting light reaches the spectrometer through the optical combiner.

In view of above, a sensing substrate of an embodiment of the present disclosure has a quantum well structure and a sensing surface, so as to improve a signal intensity during the excitation of the testing sample. A sensor of an embodiment of the present disclosure can effectively detect a testing sample by providing a first detecting light on the sensing substrate.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
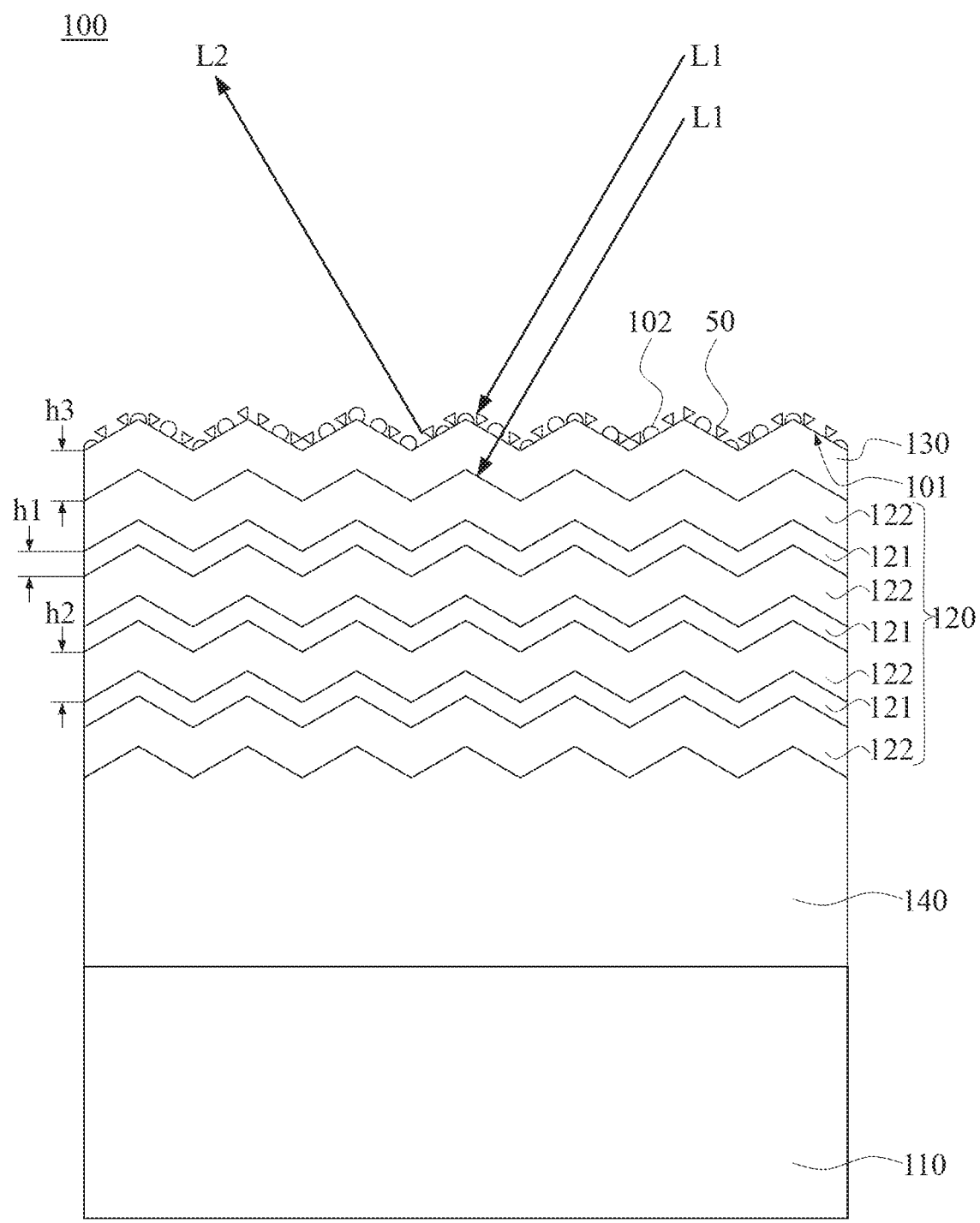
FIG. 1 is a schematic sectional view of a sensing substrate according to an embodiment of the present disclosure.

Reference will now be made in detail to the present embodiments of the disclosure, examples of which are illustrated in the accompanying drawings. Wherever possible, the same reference numbers are used in the drawings and the description to refer to the same or like parts.

A sensing substrate and a sensor of the present disclosure can be utilized in a spectroscopy device. For example, sensing substrate and sensor of the present disclosure can be utilized in a Raman spectroscopy device. The detailed description of the sensing substrate and the sensing substrate applied to the sensor of the present disclosure will be described below in several embodiments.

Although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments.

In the figures, the thickness of layers, films, panels, regions, etc., are exaggerated for clarity. Throughout the specification, the same reference numerals denote the same component. It will be understood that when a component such as a layer, a film, a region or a substrate is referred to as "on" or "connected to" another component, intermediate components can also be present. In contrast, when a component is referred to as "directly on" or "directly connected to" another component, no intermediate component can be present. As used herein, "connected" may refer to both physical and/or electrical connections. Furthermore, "electrical connection" or "coupled" may be the presence of other components between two elements.

Spatially relative terms (e.g., "beneath," "below," "lower," "above," "upper" and the like) may be used herein for ease of description to describe one element or a relationship between a feature and another element or feature as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, for example, the term "below" can encompass both an orientation that is above, as well as, below. The device may be otherwise oriented (rotated 90 degrees or viewed or referenced at other orientations) and the spatially relative descriptors used herein should be interpreted accordingly.

FIG. 1 is a schematic sectional view of a sensing substrate according to an embodiment of the present disclosure. Please refer to FIG. 1, in an embodiment of the present disclosure, a sensing substrate 100 includes a substrate 110, a quantum well structure 120, a sensing surface 101, and a plurality of metal nanoparticles 102. The quantum well structure 120 is disposed on the substrate 110, and the metal nanoparticles 102 are disposed on the sensing surface 101, and the sensing surface 101 is adapted to carry a testing sample 50. The sensing surface 101 of the embodiment is a rough surface. In other words, the sensing surface 101 of the embodiment has a plurality of microstructures.

In FIG. 1 and the following figures, the metal nanoparticles 102 are represented by circular symbols of the same size, and molecules of the testing sample 50 are represented by triangular symbols of the same size. The symbols are intended to illustrate the relative position of these elements, and it is not intended to limit the sizes, shapes and locations of the metal nanoparticles 102 and the molecules of the testing sample 50.

The quantum well structure 120 includes a plurality of first metal nitride layers 121 and a plurality of second metal nitride layers 122. The first metal nitride layers 121 and the second metal nitride layers 122 are disposed on the substrate 110 in a staggered manner.

The quantum well structure 120 of the embodiment is located between the sensing surface 101 and the substrate 110, and position of the quantum well structure 120 is adjacent to the sensing surface 101. When the sensing surface 101 receive a first detecting light L1, the quantum well structure 120 will be excited by the first detecting light L1, and the quantum well structure 120 will emit photons.

In some embodiments of the present disclosure, materials of the first metal nitride layers 121 of the quantum well structure 120 may include gallium indium nitride (InGaN), aluminum gallium nitride (AlGaN), or gallium nitride (GaN). In other embodiments of the present disclosure, materials of the second metal nitride layer 122 of the quantum well structure 120 may include GaN, aluminum nitride (AlN), InGaN, or AlGaN. For example, the band gap of the first metal nitride layer 121 is lower than the band gap of the second metal nitride layer 122, and, therefore; the first metal nitride layers 121 can form a plurality of quantum wells in the quantum well structure 120.

Please refer to FIG. 1, in the embodiment, the sensing surface 101 is a rough surface, being able to carry more testing sample 50 and metal nanoparticles 102, and the molecules of the testing sample 50 and the metal nanoparticles 102 can form a plurality of resonance gaps on the sensing surface 101, respectively. When the first detecting light L1 reaches the sensing surface 101, and the testing sample 50 can emit a second detecting light L2 after being excited by the first detecting light L1, and the intensity of the second detecting light L2 can be enhanced by the resonance taking place among the target molecule in the testing sample 50, the metal nanoparticles 102 and the quantum wells in the quantum well structure 120.

For example, the second detecting light L2 includes Raman scattering (or Raman signal) of the testing sample 50, and user can perform a qualitative measurement to the testing sample 50 by analyzing the second detecting light L2. Since the sensing substrate 100 includes quantum well structure 120, and the first detecting light L1 can excite the quantum well structure 120, the quantum well structure 120 will emits additional photons. The photons emitted by the quantum well structure 120 can further reabsorb by the testing sample 50, and the intensity of the second detecting light L2 may be further enhanced. Also, density of the carriers at the conduction band or any other high energy bands on the sensing surface 101 of the sensing substrate 100 can be increased, and the testing sample 50 on the sensing surface 101 and the carriers may resonate, so as to boost the intensity of Raman scattering. Therefore, the sensing substrate 100 can enhance the intensity of the second detection light L2 and the detection efficiency of the testing sample 50 with the quantum well structure 120, metal nanoparticles 102, and the sensing surface 101.

For example, a material of the substrate 110 may include sapphire, so as to provide a proper carrier surface 11 for the growth of the semiconductor layers, but the disclosure is not limited thereto. In other embodiment, the material of the substrate 110 may include silicon or silicon carbide (SiC).

In the quantum well structure 120, the first metal nitride layer 121 has thickness h1, and the second metal nitride layer 122 has thickness h2. For example, the thickness h1 of the first metal nitride layer 121 is half of the thickness h2 of the second metal nitride layer 122.

Materials of the metal nanoparticles 102 are gold, but the disclosure is not limited thereto. In other embodiment of the disclosure, materials of the metal nanoparticles 102 may include silver, aluminum, or copper. Therefore, surface electrodes of the metal nanoparticles 102 can oscillate with the testing sample 50 and the photons scattered from the testing sample 50. For example, metal nanoparticles 102 are adapted to generate localize surface plasma resonance (LSPR) with the testing sample 50. Formation of the metal nanoparticles 102 may include: forming a metal layer having thickness of 7 nanometer (nm) with e-beam evaporator, while the material of the metal layer may be gold, followed by the annealing at 300° C. for 140 seconds in $N_2$. In the embodiment, diameters of the metal nanoparticles 102 are from 10 nm to 100 nm.

Also, in the quantum well structure 120, number of the first metal nitride layers 121 is three, but the disclosure is not limited thereto. In other embodiment of the present disclosure, the number of the first metal nitride layer 121 is from 1 to 15.

Please refer to FIG. 1, in the embodiment, the sensing substrate 100 further includes a undoped semiconductor layer 130. The undoped semiconductor layer 130 is disposed on the quantum well structure 120, and the sensing surface 101 is located on the undoped semiconductor layer 130. Furthermore, the undoped semiconductor layer 130 covers the quantum well structure 120, and the undoped semiconductor layer 130 has a thickness h3. For example, the thickness h3 of the undoped semiconductor layer 130 is 6 nm. Therefore, undoped semiconductor layer 130 can provide a protection on the quantum well structure 120 and a proper gap between the sensing surface 101 and the quantum well structure 120, so as to increase the probability of the resonance on the sensing surface 101, the testing sample 50, and the quantum well structure 120, and the Raman scattering in the second detecting light L2 may also increase. Also, in order to form the sensing surface 101 into a rough surface, microstructures on the sensing surface 101 of the sensing substrate 100 can be acquired by adjusting the gas flow and substrate temperature during the growth of the undoped semiconductor layer 130.

Please refer to FIG. 1, the sensing substrate 100 of the embodiment can further includes a first type semiconductor layer 140. The first type semiconductor layer 140 can be doped or undoped. The first type semiconductor layer 140 is disposed on the substrate 110, and the first type semiconductor layer 140 is located between the quantum well structure 120 and the substrate 110. For example, a material of the first type semiconductor layer 140 includes gallium nitride or aluminum gallium nitride, and the first type semiconductor layer 140 is a n-type doped GaN layer. The first type semiconductor layer 140 provides an excellent heat dissipation between the substrate 110 and the sensing surface 101, and the sensing substrate 100 won't be over heated. Therefore, thermal diffusion of the target molecule is mitigated, which improves the detection reliability of the testing sample 50 on the sensing surface 101.

Figure 2:
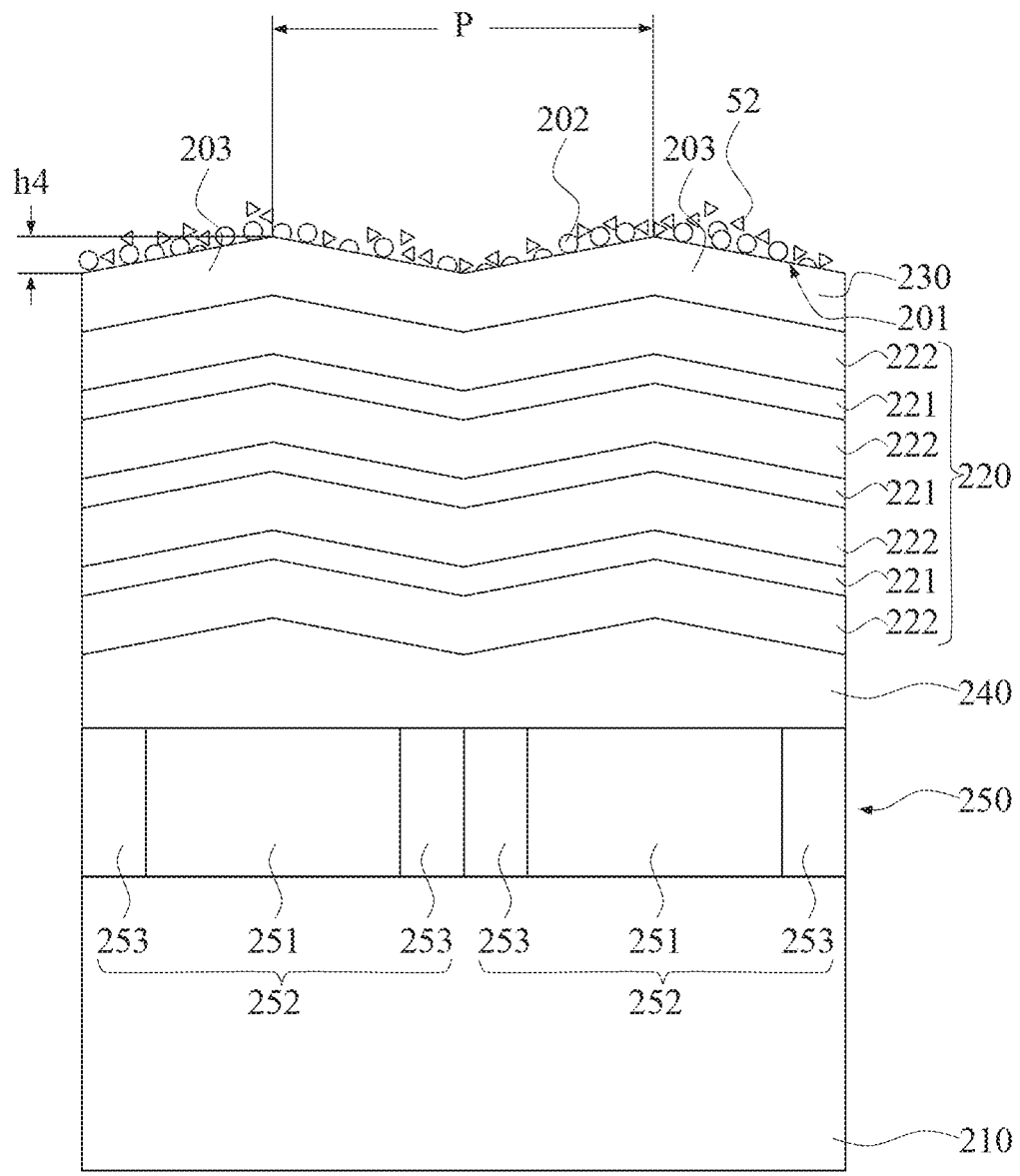
FIG. 2 is a schematic sectional view of a sensing substrate according to another embodiment of the present disclosure.

FIG. 2 is sectional view of the sensing substrate according to another embodiment of the present disclosure. Please refer to FIG. 2, in another embodiment of the present disclosure, the sensing substrate 200 is similar to the sensing substrate 100 of the above embodiment, and the sensing substrate 200 includes substrate 210, quantum well structure 220, undoped semiconductor layer 230, sensing surface 201 being able to carry testing sample 52, first type semiconductor layer 240, and metal nanoparticles 202 disposed on the sensing surface 201. The quantum well structure 220 includes a plurality of first metal nitride layers 221 and a plurality of second metal nitride layers 222. However, the detailed description of the same component will not be repeated here.

In the embodiment, the sensing substrate 200 further includes strain-releasing layer 250, and the strain-releasing layer 250 is disposed between the first type semiconductor layer 240 and the substrate 210. For example, the first type semiconductor layer 240 can be n-type doped GaN layer, and the material of the substrate 210 includes sapphire, and the strain-releasing layer 250 can release strain between the first type semiconductor layer 240 and the substrate 210.

In the embodiment, the strain-releasing layer 250 includes a plurality of strain-releasing rods 252 being distributed on the substrate 210. To be specific, in the embodiment, the manufacturing method of the sensing substrate 200 includes: providing substrate 210; forming quantum well structure 220 on the substrate 210; forming sensing surface 201; and disposing the metal nanoparticles 202 on the sensing surface 201. Before the deposition of the quantum well structure 220 on the substrate 210, the manufacturing method of the embodiment further includes disposing a plurality of strain-releasing rods 252, so as to form a strain-releasing layer 250 on the substrate 210.

The strain-releasing rods 252 include a plurality of zinc oxide cores 251, and the manufacturing method of the strain-releasing rods 252 includes forming the zinc oxide cores 251 on the substrate 210; and forming strain-releasing rods 252 by disposing a gallium nitride shell 253 around every zinc oxide cores 251. In other words, the gallium nitride shells 253 surround the zinc oxide cores 251 respectively and form into the strain-releasing rods 242. For example, the zinc oxide core 251 can be formed by hydrothermal method.

In some embodiments of the present disclosure, the strain-releasing rod 242 may include zinc oxide core 251 and a semiconductor pipe having the same shape of the gallium nitride shell 253 surrounding the zinc oxide core 251, and a material of the semiconductor pipe may include aluminum nitride or aluminum gallium nitride. In other embodiments of the present disclosure, the strain-releasing layer 250 can be formed by a single layer, and material of the single layer may include gallium nitride, aluminum nitride or aluminum gallium nitride.

Please refer to FIG. 2, the manufacturing method of the sensing substrate 200 of the embodiment includes forming a first type semiconductor layer 240 on the strain-releasing layer 250 after forming the strain-releasing layer 250. The strain between the substrate 210 and the first type semiconductor layer 240 can be release by the zinc oxide cores 251 of the strain-releasing layer 250.

Also, in the embodiment, the sensing surface 201 may include a plurality of pyramidal nanostructures 203, and pitches between the pyramidal nanostructures 203 are from 100 nm to 3000 nm, and heights h4 of the pyramidal nanostructures 203 are from 200 nm to 300 nm. Furthermore, the first type semiconductor layer 240, the quantum well structure 220, and the sensing surface 201 are conformally disposed on the strain-releasing rods 252 in sequence, and, therefore; the pyramidal nanostructures 203 may be formed on the sensing surface 201 corresponded to the strain-releasing rods 252.

Also, after the manufacturing method of the sensing substrate 200 form the quantum well structure 220, the formation of the sensing surface 201 includes forming a undoped semiconductor layer 230 on the quantum well structure 220, and the sensing surface 201 is located on the undoped semiconductor layer 230.

Furthermore, step of forming the undoped semiconductor layer 230 includes providing a chamber having a nitrogen ambiance, while a pressure of the nitrogen ambiance is from 150 mbar to 250 mbar, and a temperature of the nitrogen ambiance is from 580° C. to 1200° C. The undoped semiconductor layer 230 can be disposed on the quantum well structure 220 by the steps, and the sensing surface 201 on the undoped semiconductor layer 230 may include a plurality of microstructures and form into a rough surface. However, in order to clearly indicate the position of the various components in FIG. 2, the microstructures on the sensing surface 201 is not further depicted, and is not intended to limit the component aspects of the present disclosure.

Figure 3:
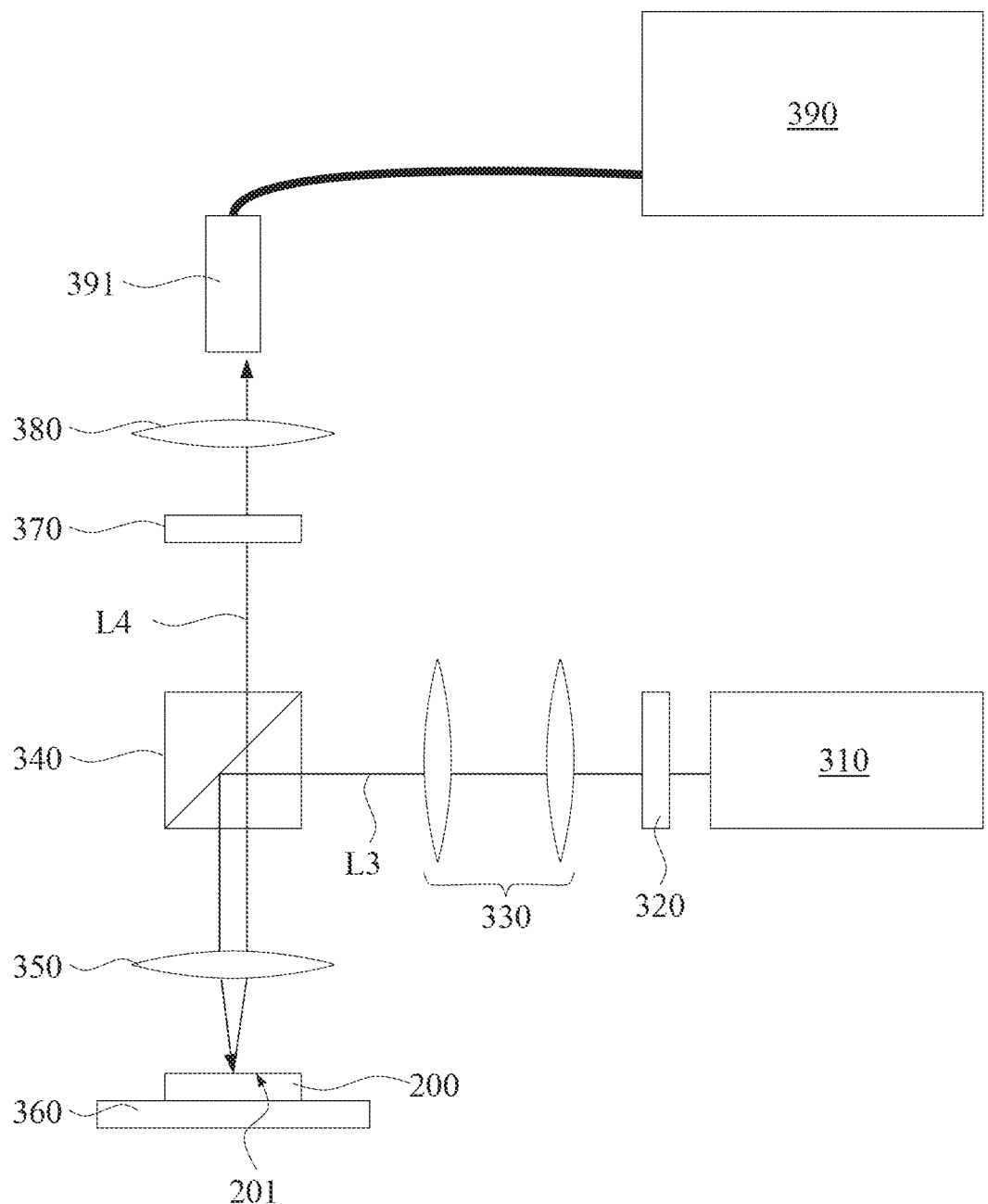
FIG. 3 is a schematic view of a sensor according to an embodiment of the present disclosure.

FIG. 3 is a schematic view of the sensor of the embodiment of the present disclosure. Please refer to FIG. 3, the sensor 300 includes a sensing light source 310, an optical combiner 340, the sensing substrate 200, and a spectrometer 390.

The sensing light source 310 provides a first detecting light L3. The first detecting light L3 reaches the sensing substrate 200 through the optical combiner 340. The sensing surface 201 carries the testing sample 52 (please refer to FIG. 2), and the testing sample 52 generate a second detecting light L4 after excited by the first detecting light L3, and the second detecting light L4 reaches the spectrometer 390 through the optical combiner 340.

For example, sensor 300 can includes neutral density filter 320 (ND filter), beam expander lenses 330, objective lens 350, Raman filter 370, and focus lens 380. Also, the sensing light source 310 can be 532 nm solid-state laser, and the optical combiner 340 can be dichroic mirror. The sensing substrate 200 can be disposed on a movable carrier 360, and the spectrometer 390 may include light receiver 391, so as to receive the second detecting light L4 from the sensing substrate 200.

Therefore, the sensor 300 of the embodiment can provide a detection of the testing sample on the sensing substrate 200 with higher efficiency and reliability with the sensing substrate 200.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A sensing substrate, comprising:
   a substrate;
   a quantum well structure disposed on the substrate, wherein the quantum well structure comprises:
      at least one first metal nitride layer, and
      a plurality of second metal nitride layers disposed on the substrate in staggered manner with the first metal nitride layer;
   a strain-releasing layer between the quantum well structure and the substrate, and comprising a plurality of strain-releasing rods distributed on the substrate, wherein each of the strain-releasing rods includes a zinc oxide core and a gallium nitride shell surrounding the zinc oxide core;
   a sensing surface being adapted to carry a test sample; and
   a plurality of metal nanoparticles disposed on the sensing surface,
   wherein the quantum well structure is disposed between the substrate and the sensing surface, and the sensing surface is a rough surface.

2. The sensing substrate of claim 1, wherein the test sample is disposed near the metal nanoparticles.

3. The sensing substrate of claim 1, wherein a material of the substrate includes sapphire, silicon, or silicon carbide.

4. The sensing substrate of claim 1 further comprising:
   a first type semiconductor layer disposed on the substrate, wherein the first type semiconductor layer is disposed between the quantum well structure and the substrate.

5. The sensing substrate of claim 4, wherein a material of the first type semiconductor layer includes gallium nitride or aluminum gallium nitride.

6. The sensing substrate of claim 4,
   wherein the strain-releasing layer is located between the first type semiconductor layer and the substrate.

7. The sensing substrate of claim 6, wherein the strain-releasing layer comprises:
   a single layer of gallium nitride, aluminum nitride, or aluminum gallium nitride on the substrate.

8. The sensing substrate of claim 1, wherein a number of the first metal nitride layer in the quantum well structure is from 1 to 15.

9. The sensing substrate of claim 1 further comprising:
an undoped semiconductor layer disposed on the quantum well structure, wherein the sensing surface is located on the undoped semiconductor layer.

10. The sensing substrate of claim 9, wherein a thickness of the undoped semiconductor layer is about 6 nm.

11. The sensing substrate of claim 1, wherein a material of the metal nanoparticles includes gold, aluminum, silver, or copper.

12. The sensing substrate of claim 1, wherein the sensing surface has a plurality of pyramidal nanostructures, and pitches between the pyramidal nanostructures are from 100 nm to 3000 nm.

13. The sensing substrate of claim 1, wherein a gap between two of the metal nanoparticles adjecent to each other is in a range from 0 to 100 nm.

14. A manufacturing method of a sensing substrate, comprising:
providing a substrate;
forming a strain-releasing layer on the substrate, comprising:
forming a plurality of zinc oxide cores on the substrate with a hydrothermal method; and
forming a plurality of gallium nitride shells around the zinc oxide cores respectively,
and the zinc oxide cores and the gallium nitride shells form a plurality of strain-releasing rods respectively, and the strain-releasing rods form the strain-releasing layer;
forming a quantum well structure on the substrate;
forming a sensing surface; and
disposing a plurality of metal nanoparticles on the sensing surface,
wherein the quantum well structure comprises at least a first metal nitride layer and a plurality of second metal nitride layers, and the first metal nitride layer and the second metal nitride layers are disposed on the substrate in a staggered manner, and the sensing surface is a rough surface.

15. The manufacture method of claim 14, before the step of forming the quantum well structure on the substrate, further comprising:
forming a first type semiconductor layer on the strain-releasing layer.

16. The manufacture method of claim 15, wherein the step of forming the strain-releasing layer on the substrate further comprises:
forming a single layer of gallium nitride, aluminum nitride, or aluminum gallium nitride on the substrate.

17. The manufacture method of claim 14, wherein the step of forming the sensing surface further comprises:
forming an undoped semiconductor layer on the quantum well structure,
wherein the sensing surface is on the undoped semiconductor layer.

18. The manufacture method of claim 17, wherein the step of forming the undoped semiconductor layer further comprises:
providing a chamber having a nitrogen ambiance,
wherein a pressure of the nitrogen ambiance is from 150 mbar to 250 mbar, and a temperature of the nitrogen ambiance is from 580° C. to 1200° C.

19. A sensor, comprising:
a sensing light source providing a first detecting light;
an optical combiner;
a sensing substrate, and
a spectrometer,
wherein sensing substrate comprises a substrate, a quantum well structure disposed on the substrate, a strain-releasing layer between the quantum well structure and the substrate, a sensing surface being adapted to carry a test sample; and a plurality of metal nanoparticles disposed on the sensing surface, wherein the strain-releasing layer comprises a plurality of strain-releasing rods distributed on the substrate, and each of the strain-releasing rods includes a zinc oxide core and a gallium nitride shell surrounding the zinc oxide core, and the quantum well structure comprises:
at least one first metal nitride layer, and
a plurality of second metal nitride layers disposed on the substrate in staggered manner with the first metal nitride layer, and the quantum well structure is disposed between the substrate and the sensing surface, and the sensing surface is a rough surface, and the first detecting light reaches the sensing substrate through the optical combiner, and the sensing surface carries the testing sample, and the testing sample generate a second detecting light after excited by the first detecting light, and the second detecting light reaches the spectrometer through the optical combiner.

* * * * *